(12) United States Patent
Kelly

(10) Patent No.: US 8,309,890 B1
(45) Date of Patent: Nov. 13, 2012

(54) PORTABLE PET WARMER AND ASSOCIATED METHOD

(76) Inventor: William Kelly, Interlachen, FL (US)

( * ) Notice: Subject to any disclaimer, the term of this patent is extended or adjusted under 35 U.S.C. 154(b) by 425 days.

(21) Appl. No.: 12/635,642

(22) Filed: Dec. 10, 2009

Related U.S. Application Data

(60) Provisional application No. 61/201,434, filed on Dec. 10, 2008.

(51) Int. Cl.
*G03G 15/20* (2006.01)

(52) U.S. Cl. ........ 219/240; 219/643; 219/201; 219/209; 219/226; 219/241; 219/463.1; 219/464.1; 219/520; 219/534

(58) Field of Classification Search ................ 219/643, 219/201, 209, 226, 240, 241, 463.1, 464.1, 219/520, 534
See application file for complete search history.

(56) References Cited

U.S. PATENT DOCUMENTS

| | | | |
|---|---|---|---|
| 1,013,327 A | 1/1912 | Smith | |
| 1,347,995 A | 7/1920 | Dendy | |
| 1,723,743 A | 8/1929 | Mason | |
| 1,814,940 A | 9/1929 | Long | |
| 1,755,204 A | 4/1930 | Buffalow | |
| 1,796,761 A | 3/1931 | O'Brien | |
| 2,722,596 A | 11/1955 | Drouet | |
| 3,160,139 A | 12/1964 | Wales | |
| 4,008,454 A * | 2/1977 | Bowling | 337/386 |
| 4,375,589 A | 3/1983 | Combs | |
| 4,395,619 A * | 7/1983 | Harigai | 392/410 |
| 4,577,176 A * | 3/1986 | Bayer | 337/394 |
| 6,262,404 B1 * | 7/2001 | Higaya et al. | 219/619 |
| 6,643,491 B2 * | 11/2003 | Kinouchi et al. | 399/330 |
| 7,257,361 B2 * | 8/2007 | Takagi et al. | 399/330 |

* cited by examiner

*Primary Examiner* — Eugene Lee

(57) ABSTRACT

A portable pet warmer may include an outer cylinder and front and rear covers. An inner cylinder may be removably positioned within the outer cylinder. The inner cylinder remains spaced from the outer cylinder while the inner cylinder is positioned within the outer cylinder. A thermostat and a heating element may be located within the apparatus and adapted to be coupled to an external 115 volt alternating current power supply source. A mounting plate and retainer springs are used to hold the thermostat at a secure position during use while permitting easy access to the thermostat during maintenance. An internal power supply source providing a 12 volt direct current to the thermostat may further be electrically coupled to the circuit breaker.

11 Claims, 17 Drawing Sheets

PORTABLE PET WARMER AND ASSOCIATED METHOD

CROSS REFERENCE TO RELATED APPLICATIONS

This application claims the benefit of U.S. Provisional Application No. 61/201,434, filed Dec. 10, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to heaters and, more particularly, to a portable pet warmer for providing users with a safe and reliable heat source for warming their pets inside and outside of a dwelling.

2. Prior Art

Statistics compiled from the American Pet Products Manufacturers Association 2007-2008 National Pet Owners Survey indicates that there are approximately 74.8 million owned dogs in the United States. 39% of U.S. households own at least one dog. Most owners (63 percent) own one dog while 25% of owners own two dogs and 12% of owners own three or more dogs. On average, dog owners spent $219 on veterinary visits (vaccine, well visits) annually. There are actually more, i.e. approximately 88.3 million owned cats in the United States. Nearly 34% of U.S. households (or 38.4 million) own at least one cat. 56% of owners own more than one cat and on average, owners have two cats each. Cat owners also spent an average of $175 on routine veterinary visits.

A majority of these pets are housed indoors although dogs with their perennial hair shedding may force pet owners to find an additional shelter outside in the yard. While many pet supply stores and online manufacturers make great quality dog kennels with heating and AC included, they may be both expensive and non-portable. Whether indoors or outdoor shelters are used, pets will need a proper bedding on which to sleep. In winter, most of these beddings may additionally be equipped with a hot water bottle or snuggle disk if a home is chilly. These heat devices do not maintain their heat for long and pet owners have to periodically monitor their temperatures to ensure that they are warm and yet not hot enough to burn their precious pets. In the event that a cold wave develops during the night or when a pet owner is away, these devices may not keep their warm till the owner returns home or is able to check on them.

Accordingly, a need remains for a portable pet warmer in order to overcome the above-noted shortcomings. The present invention satisfies such a need by providing a device that is convenient and easy to use, is durable yet lightweight in design, is versatile in its applications, and provides users with a safe and reliable heat source for warming their pets inside and outside of a dwelling.

BRIEF SUMMARY OF THE INVENTION

In view of the foregoing background, it is therefore an object of the present invention to provide an apparatus for providing a safe and reliable heat source. These and other objects, features, and advantages of the invention are provided by a portable pet warmer.

The portable pet warmer may include an outer cylinder preferably having axially opposed front and rear open ends and front and rear covers removably attached to the front and rear open ends respectively. An inner cylinder may be removably positioned within the outer cylinder such that a plurality of retainer clips mated to an outer surface of the inner cylinder may be removably engaged with an inner surface of the outer cylinder. In this way, the inner cylinder remains spaced from the outer cylinder while the inner cylinder is positioned within the outer cylinder. Such an arrangement provides the unexpected and unpredictable advantage of allowing an even distribution and transfer of heat between the inner and outer cylinders.

A thermostat may be located within the outer cylinder and disposed exterior of the inner cylinder. A heating element may be located within the inner cylinder and adapted to be coupled to an external 115 volt alternating current power supply source. A fan may be located in the outer cylinder for circulating heated air outwardly therefrom. A mounting plate may be attached to the outer cylinder and located therein. A plurality of retainer springs may further be coupled to the mounting plate and oriented perpendicular to each other for maintaining the thermostat at a substantially stable position downstream of the heating element. Such an arrangement provides the unexpected and unpredictable advantage of modularly allowing replacement of defective parts of the apparatus to be carried out easily by a user without having to replace the whole apparatus.

A circuit breaker may further be communicatively coupled to the thermostat. An internal power supply source providing a 12 volt direct current to the thermostat may further be electrically coupled to the circuit breaker such that the circuit breaker automatically interrupts power to the heating element when the thermostat detects a temperature within the outer cylinder that exceeds a predetermined threshold temperature. Such an arrangement provides the unexpected and unpredictable advantage of ensuring that the temperature of the apparatus may be maintained at a predetermined setting without the risk of overheating and causing a fire and damaging the components of the apparatus 10.

In one embodiment, a heart beat simulator may be situated within the outer cylinder and electrically coupled to the internal power supply source. Such an arrangement provides the unexpected and unpredictable advantage of providing a nursing pet with simulated puppy heart beats to keep her alert in a warm environment in which to nurse her babies comfortably.

The outer cylinder may further include a thermal protection layer wrapped about an outer surface and a hook attached to the outer surface for positioning the portable pet warmer above a ground level. A plurality of bumper posts may further be removably abutted with the inner cylinder in such a manner that the inner cylinder remains upstream of the mounting plate, the thermostat and the fan respectively. The front and rear covers are adjustable vents for selectively directing air flow into and away from the outer cylinder. Such an arrangement provides the unexpected and unpredictable advantage of providing a well spaced and insulated apparatus with adequate air flow to maintain a high reliability of the operating components. The apparatus may further be positioned safely above a ground level to avoid contact with and possibly burning a pet.

In one embodiment, the mounting plate may include a medial section and first and second lateral sections monolithically formed with opposed ends of the medial section such that the first lateral section is angularly offset at an oblique angle away from the medial section and the second lateral section is angularly offset at a perpendicular angle away from the medial section. The thermostat and the circuit breaker may further be seated directly on the medial section. Such an arrangement provides the unexpected and unpredicted advantage of having the plurality of retainer springs to be coupled to the mounting plate and oriented perpendicular to each other for maintaining the thermostat at a substantially stable position as aforementioned.

The invention may further include a method of utilizing a portable pet warmer for providing a safe and reliable heat source. Such a method preferably includes the chronological steps of: providing an outer cylinder preferably having axially opposed front and rear open ends; providing and removably attaching front and rear covers to the front and rear open ends respectively; providing and removably positioning an inner cylinder within the outer cylinder; providing and mating a plurality of retainer clips to an outer surface of the inner cylinder; providing and maintaining the inner cylinder spaced from the outer cylinder while the inner cylinder is positioned within the outer cylinder by removably engaging the retainer clips with an inner surface of the outer cylinder.

The method may further include the steps of: providing and locating a thermostat within the outer cylinder; disposing the thermostat exterior of the inner cylinder; providing and locating a heating element within the inner cylinder; providing and coupling the heating element to an external 115 volt alternating current power supply source; providing and locating a fan in the outer cylinder for circulating heated air outwardly therefrom; providing and attaching a mounting plate to the outer cylinder by locating the mounting plate within the outer cylinder; providing and coupling a plurality of retainer springs to the mounting plate; providing and maintaining the thermostat at a substantially stable position downstream of the heating element by orienting the retainer springs perpendicular to each other; providing and communicatively coupling a circuit breaker to the thermostat; providing a 12 volt direct current to the thermostat by providing and electrically coupling an internal power supply source to the circuit breaker; and providing for the circuit breaker to automatically interrupt power to the heating element when the thermostat detects a temperature within the outer cylinder that exceeds a predetermined threshold temperature.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
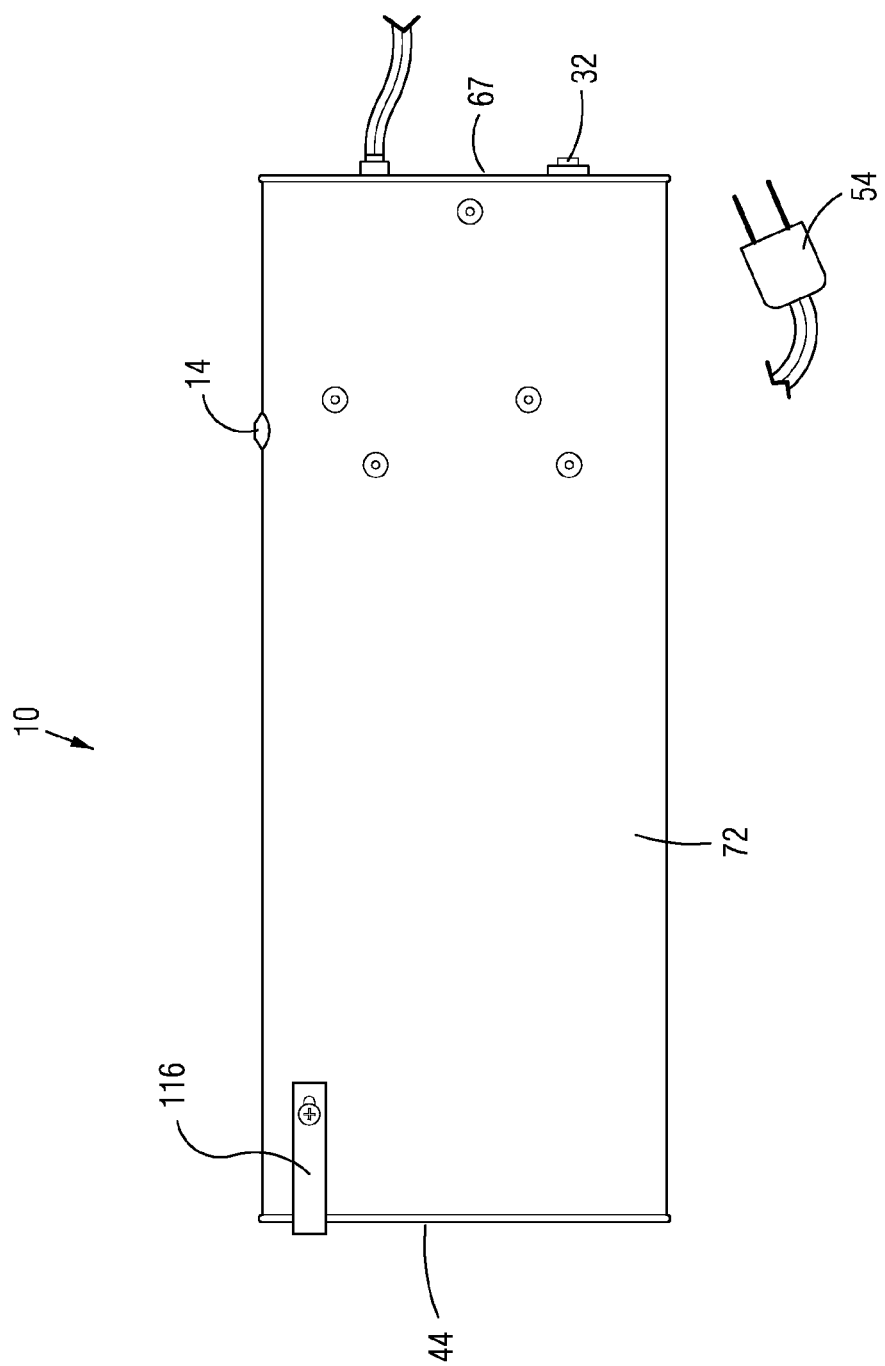
FIG. 1 is a perspective view of a portable pet warmer, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-17 by the reference numeral 10 and is intended to provide a portable pet warmer. It should be understood that the portable pet warmer 10 may be used as a reliable heat source for warming pets and many other different types of animals inside and outside of a dwelling.

Referring generally to FIGS. 1-17, the portable pet warmer 10 may include an outer cylinder 72 preferably having axially opposed front and rear open ends and a front cover 44 and a rear cover 67 removably attached to the front and rear open ends respectively. An inner cylinder 38 may be removably positioned within the outer cylinder 72 such that a plurality of retainer clips 40 mated to an outer surface 38a of the inner cylinder 38 may be removably engaged with an inner surface 72a of the outer cylinder 72. In this way, the inner cylinder 38 remains spaced from the outer cylinder 72 while the inner cylinder 38 is positioned within the outer cylinder 72. Such an arrangement provides the unexpected and unpredictable advantage of allowing an even distribution and transfer of heat between the inner and outer cylinders 38, 72.

Figure 3:
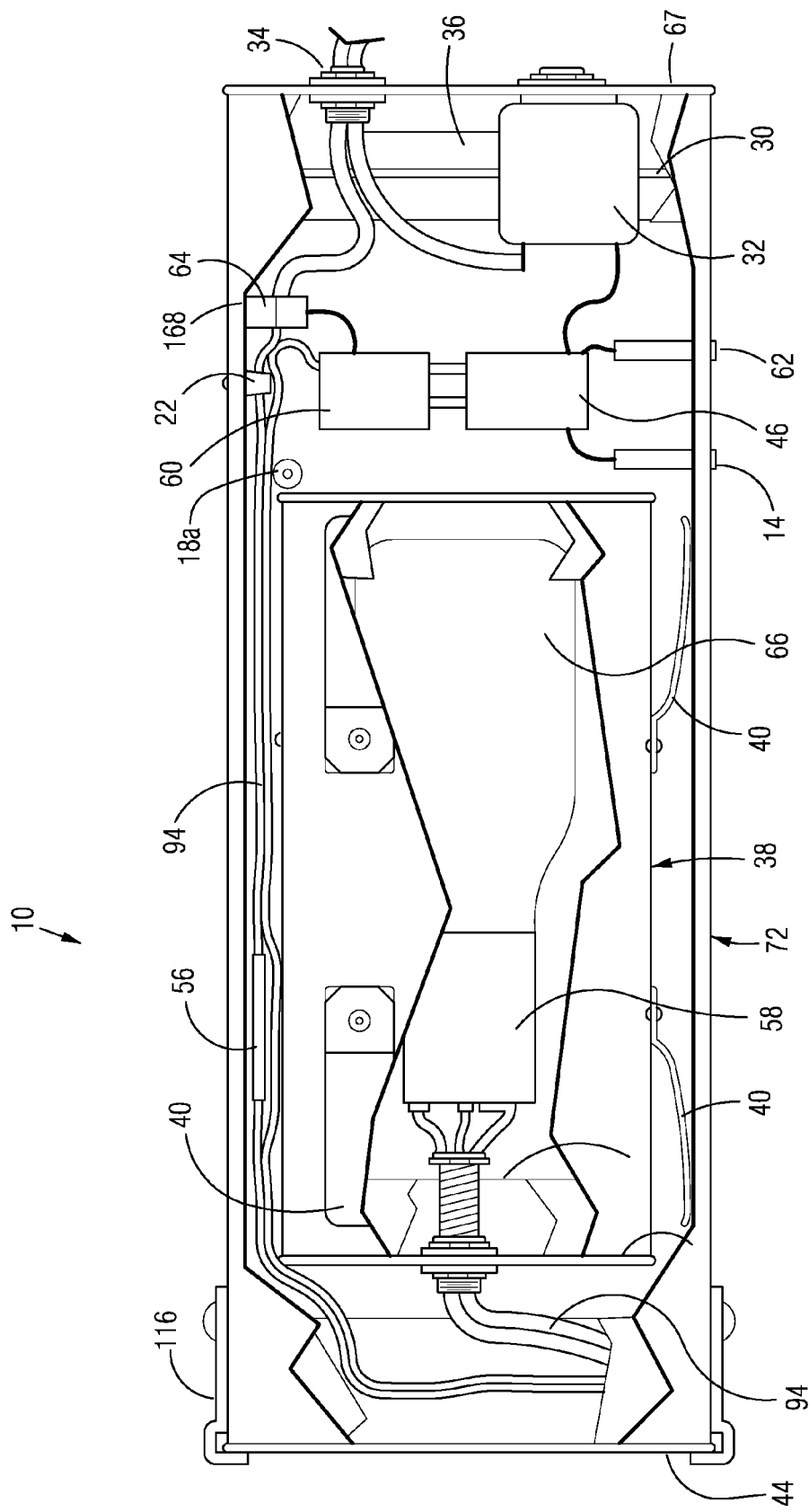
FIG. 3 is a cutaway view of the apparatus showing the outer and inner cylinders; along with the other components of the apparatus.

Referring to FIG. 3, a thermostat 46 may be located within the outer cylinder 72 and disposed exterior of the inner cylinder 38. Notably, the thermostat 46 has a first pair of retaining tabs 190 formed on outer walls thereof, respectively. A heating element 66 may be located within the inner cylinder 38 and adapted to be coupled to an external 115 volt alternating current power supply source 60. A fan 36 may be located in the outer cylinder for circulating heated air outwardly therefrom. A mounting plate 28 may be attached to the outer cylinder 72 and located therein. Notably, the mounting plate 28 has a second pair of retaining tabs 191 extending downwardly therefrom.

Figure 8:
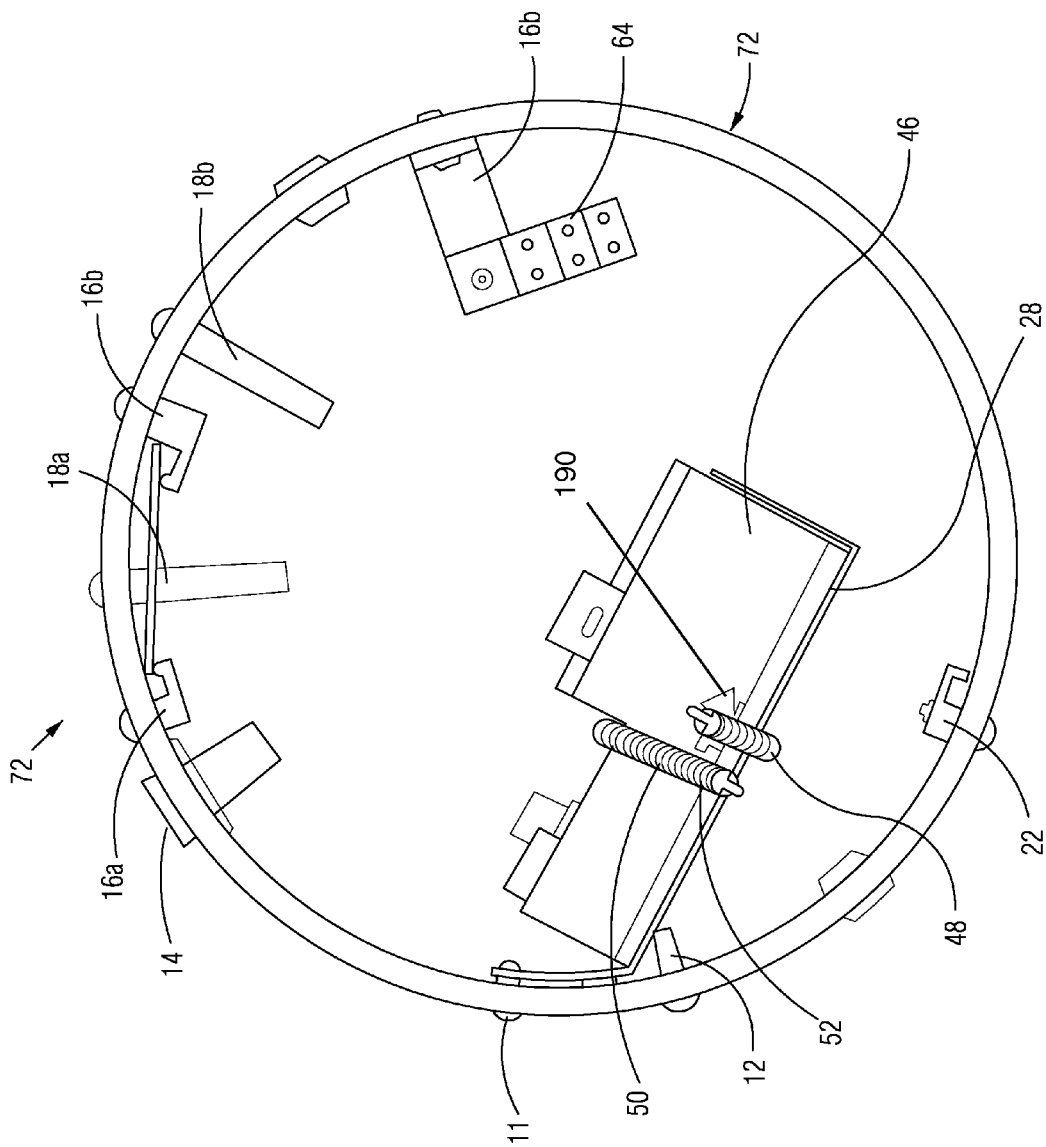
FIG. 8 is an end elevational view showing the relationships to each other of the mounted components inside the outer cylinder.
Figure 9:
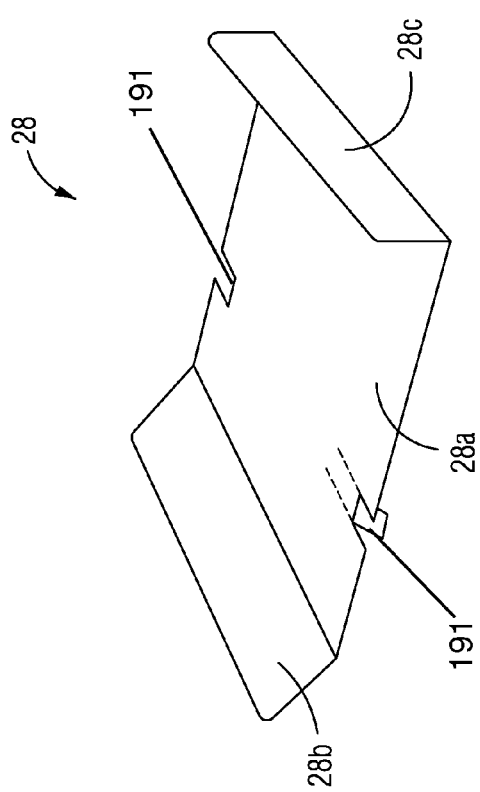
FIG. 9 is a perspective view showing the thermostat mounting plate.
Figure 10:
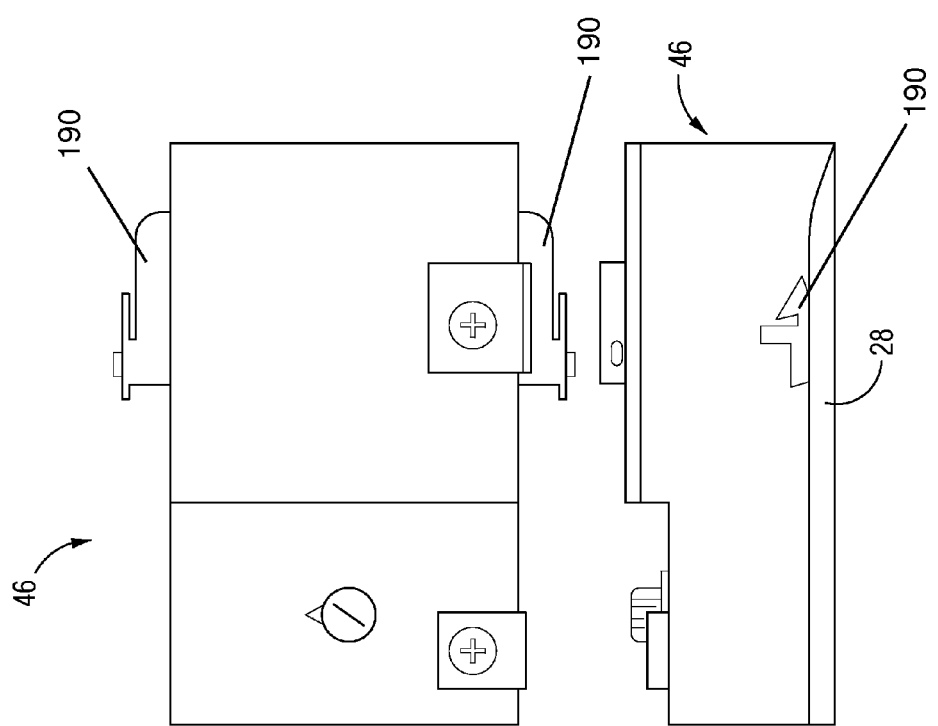
FIG. 10 is a top and side elevational view showing the thermostat.

As best shown in FIG. 8, a plurality of retainer springs 48, 52 may further be coupled to the mounting plate 28 and oriented perpendicular to each other for maintaining the thermostat 46 at a substantially stable position downstream of the heating element 66. In particular, a first one 48 of the retainer springs has end portions mated to the first pair of retaining tabs 190. A second one 52 of the retainer springs has end portions mated to the second pair of retaining tabs 191. Such an arrangement provides the unexpected and unpredictable advantage of a modularly allowing replacement of defective parts of the apparatus 10 to be carried out easily by a user without having to replace the whole apparatus 10.

Figure 14:
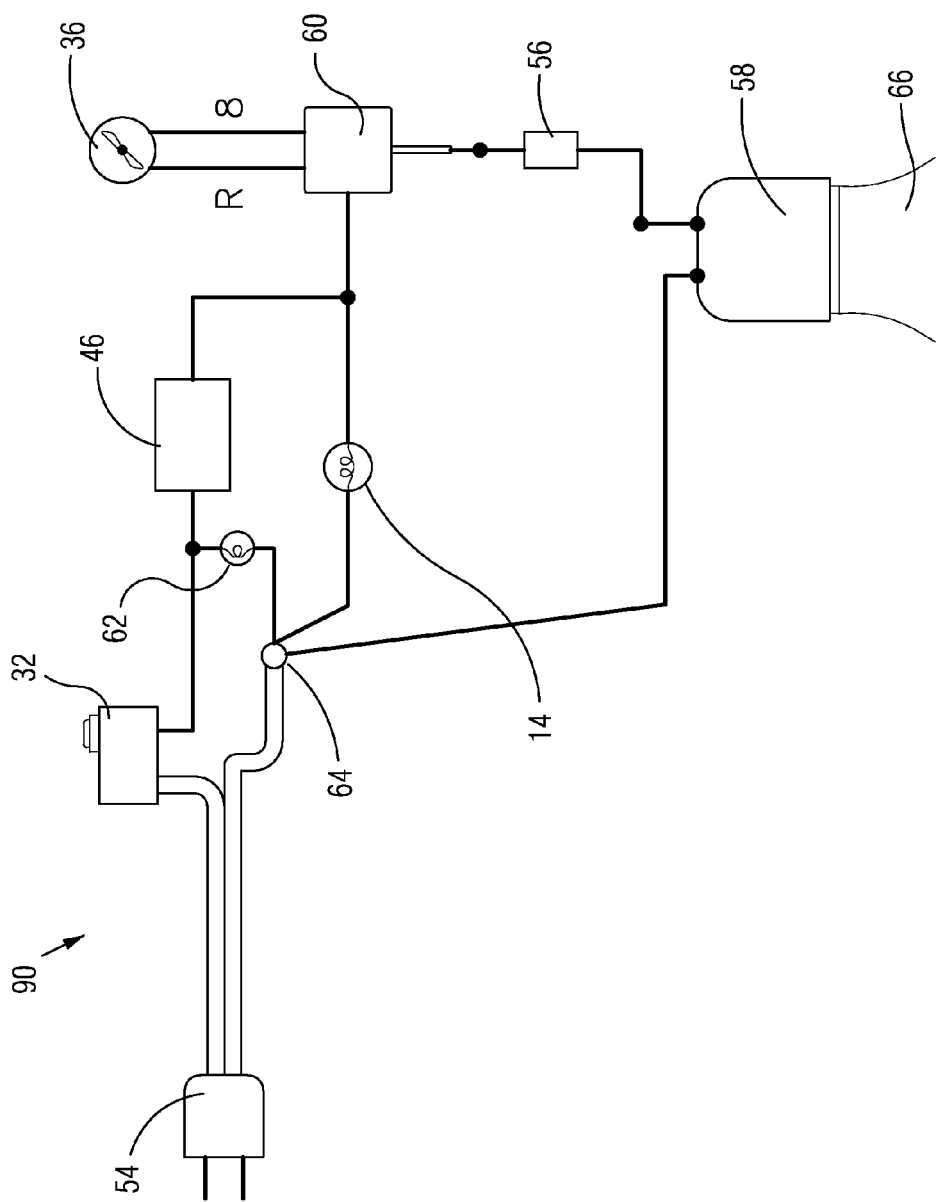
FIG. 14 is a schematic diagram showing the electrical power circuit for 115 volts AC.
Figure 15:
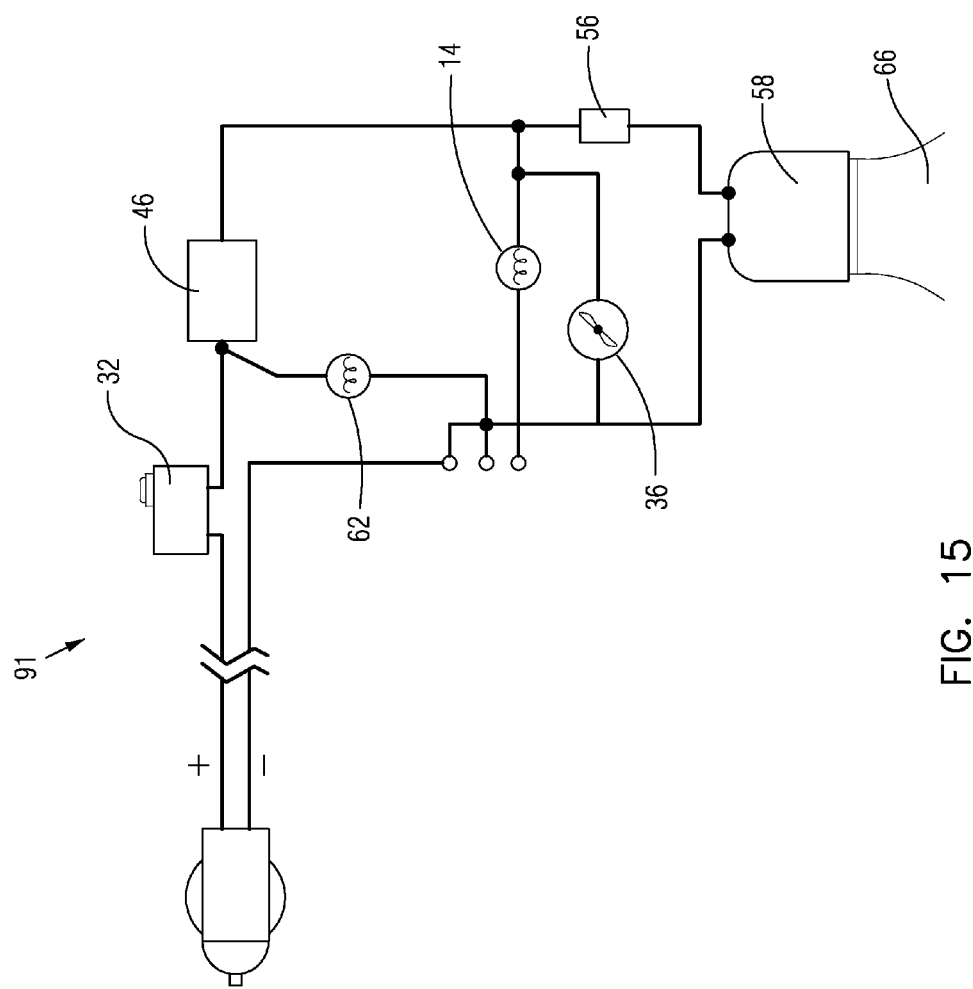
FIG. 15 is a schematic diagram showing the electrical power circuit for 12 volts DC.

Referring to FIGS. 3, 14 and 15, a circuit breaker 32 may further be communicatively coupled to the thermostat 46. An internal power supply source 60 providing a 12 volt direct current to the thermostat 46 may further be electrically coupled to the circuit breaker 32, such that the circuit breaker 32 may automatically interrupt power to the heating element 66 when the thermostat 46 detects a temperature within the outer cylinder 72 that exceeds a predetermined threshold temperature. Such an arrangement provides the unexpected and unpredictable advantage of ensuring that the temperature of the apparatus 10 may be maintained at a predetermined setting without the risk of overheating and causing a fire and damaging the components of the apparatus 10.

Figure 16:
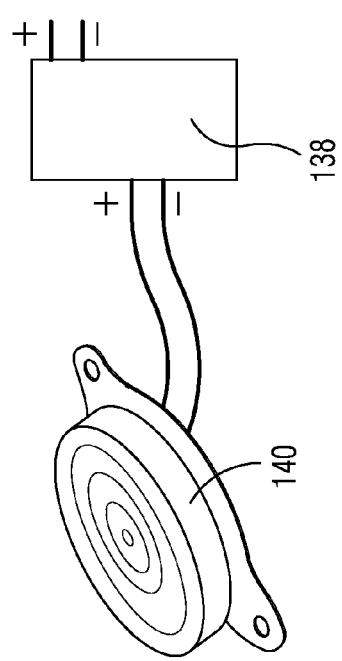
FIG. 16 is a perspective view showing the heart beat simulator module and control oscillator.

Referring to FIG. 16, a heart beat simulator 140 may be situated within the outer cylinder 72 and electrically coupled to the internal power supply source 60. Such an arrangement provides the unexpected and unpredictable advantage of providing a nursing pet with simulated puppy heart beats to keep her alert in a warm environment in which to nurse her babies comfortably.

Figure 13:
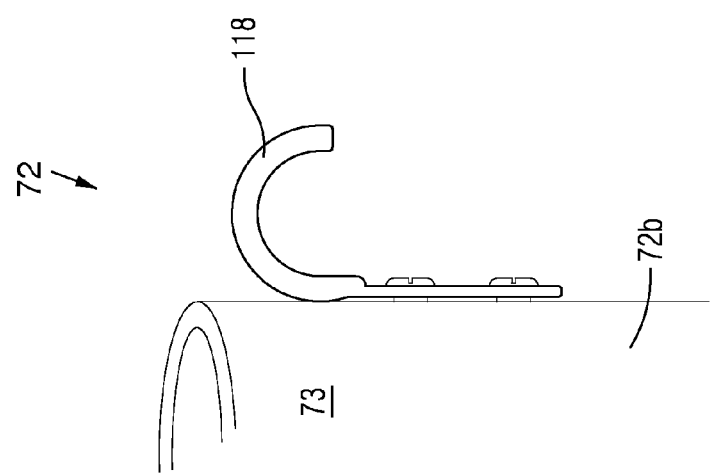
FIG. 13 is a perspective view of the hanger hook showing its location on the outer cylinder.

Referring to FIG. 13, the outer cylinder 72 may further include a thermal protection layer 73 wrapped about an outer surface 72b and a hook 118 attached to the outer surface 72b for positioning the portable pet warmer 10 above a ground level. As best shown in FIG. 8, a plurality of bumper posts 18a, 18b may further be removably abutted with the inner cylinder 38 in such a manner that the inner cylinder 38 remains upstream of the mounting plate 28, the thermostat 46 and the fan 36 respectively. The front and rear covers 44, 67 may further be adjustable vents for selectively directing air flow into and away from the outer cylinder 72. Such an arrangement provides the unexpected and unpredictable advantage of providing a well spaced and insulated apparatus 10 with adequate air flow to maintain a high reliability of the operating components. The apparatus 10 may further be positioned safely above a ground level to avoid contact with and possibly burning a pet.

Referring to FIGS. 8-11, the mounting plate 28 may include a medial section 28a and first and second lateral sections 28b, 28c monolithically formed with opposed ends of the medial section 28a such that the first lateral section 28b is angularly offset at an oblique angle away from the medial section 28a and the second lateral section 28c is angularly offset at a perpendicular angle away from the medial section 28a. The thermostat 46 and the circuit breaker 32 may further be seated directly on the medial section 28a. Such an arrangement provides the unexpected and unpredicted advantage of having the plurality of retainer springs 48, 52 to be coupled to the mounting plate 28 and oriented perpendicular to each other for maintaining the thermostat 46 at a substantially stable position as aforementioned.

Figure 2:
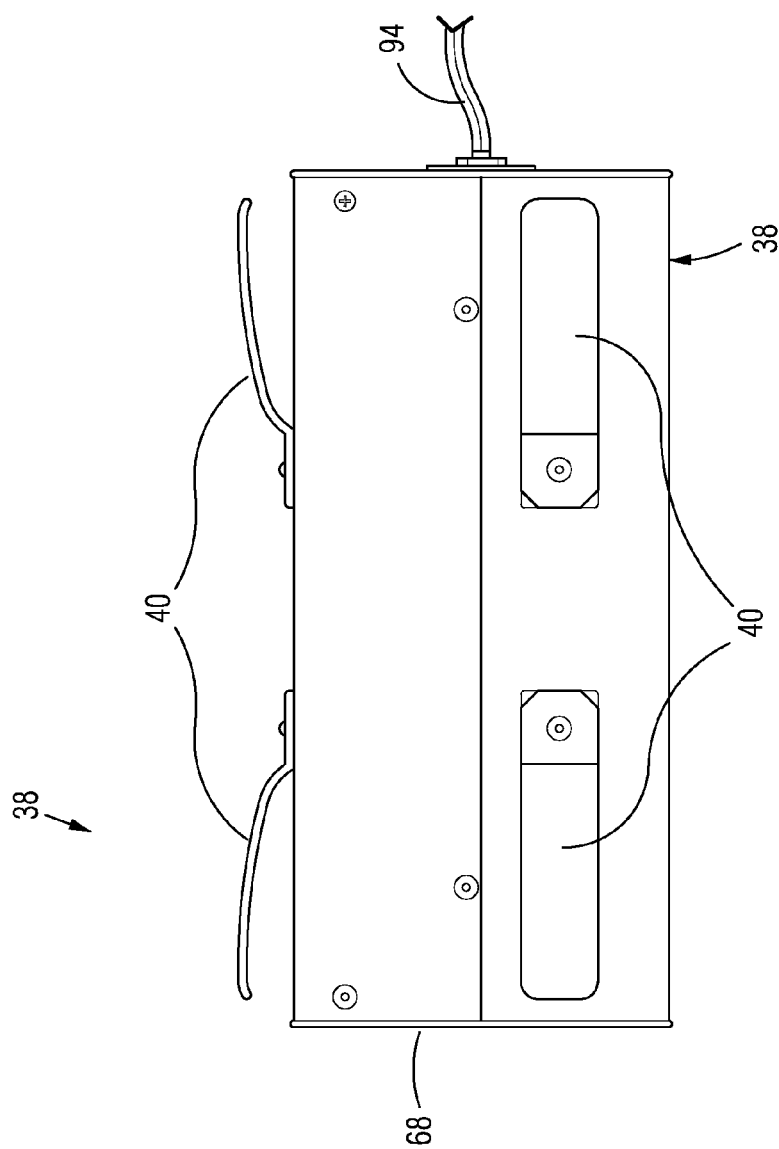
FIG. 2 is a perspective view of the inner cylinder showing the retainer clips.
Figure 4:
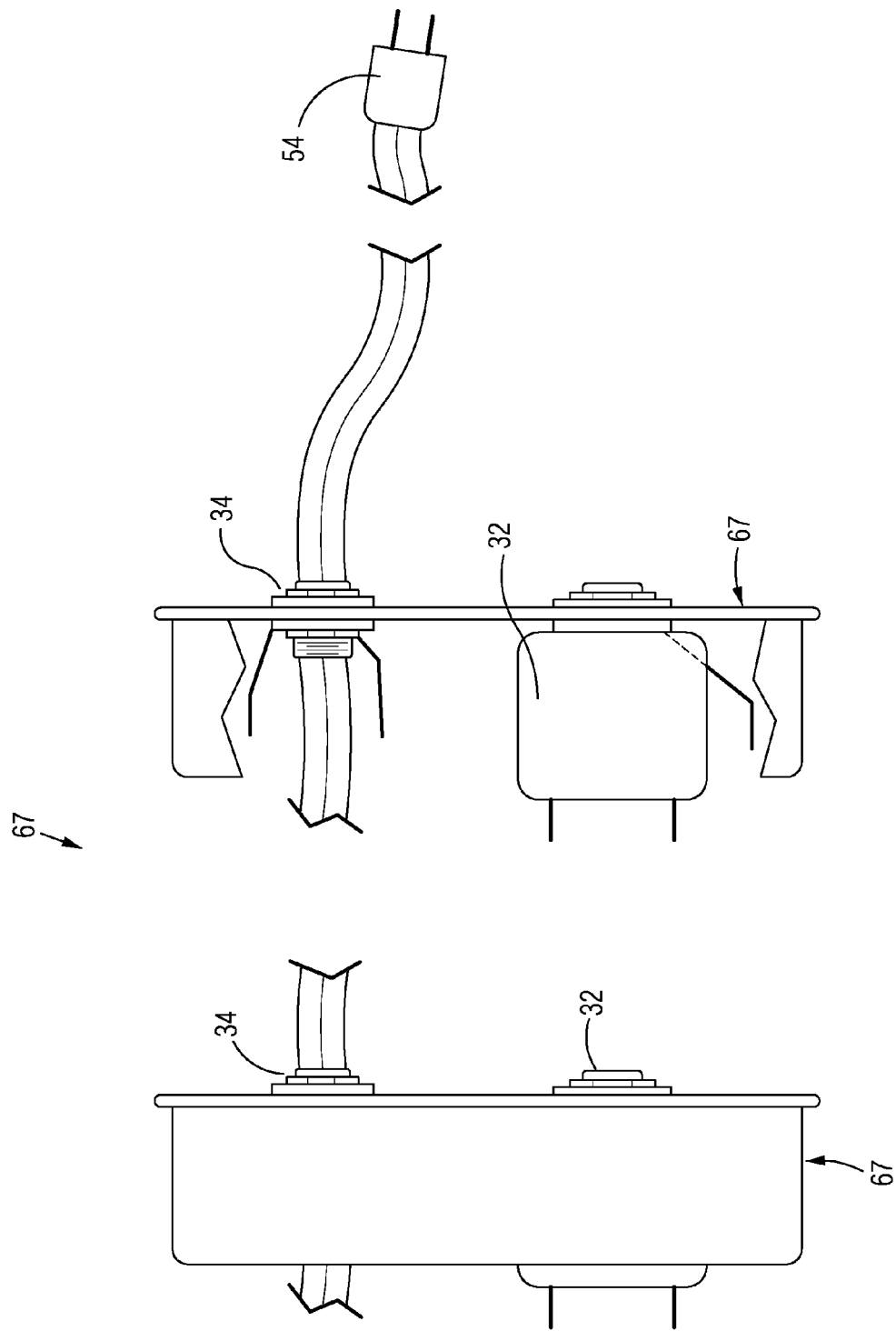
FIG. 4 is a cut away view of the rear cover showing the locating port and circuit breaker along with the mounting hardware associated with each of them.

A detailed explanation of the figures is further provided to show the advantageous features of the invention in its entirety. As shown in FIGS. 1-3 the outer cylinder, 72 may be of PVC material. The outer cylinder 72 may include within its hollow cavity, the inner cylinder 38, of 20 gauge galvanized pipe as shown in FIG. 2. As best shown in FIG. 4 and FIG. 14, power is introduced through polarized plug 54 and cord 94 supplying 115 volts AC to the apparatus 10.

The superiority of the apparatus 10 over other like apparatuses may be demonstrated by the fact that it is easily operated requiring only a power source 60 of 115V AC, or 12V DC. Further, the apparatus 10 may not require adjustments of vents or louvers to maintain a safe operating temperature due to the aforesaid construction having a forced air circulation system, which allows for an even distribution of heat.

The apparatus 10 may further be water-resistant making it ideal for use inside or outside a dwelling and may further be hung out of reach of playful pets. The thermal protection further prevents possible burns or fire from overheating by having an adjustable thermostat 46 to allow for a controlled temperature in the area required. The apparatus 10 may be easily serviced through the removable outer front cover 44. The apparatus 10 may further be overload protected with a resettable circuit breaker 32; and further having an internal power supply allowing for add on functions such as a heart beat simulator 140; is self-monitoring in the event of a component failure whereby the apparatus 10 may automatically shut down.

The portable pet warmer 10 may operate generally as follows: power is introduced into the apparatus 10 when the polarized plug 54 is connected to a power source. Referring to FIG. 3, an electrical source of 115V AC may first pass through port 34 to a resettable circuit breaker 32 mounted on the inside of cover 67. The current may pass through the circuit breaker 32 and may further be routed to the thermostat 46. After passing through the thermostat 46, the power may be routed to the 12V DC power supply 60 and operational indicator 14. The operational indicator 14 may give a real time indication of the operation of thermostat 46 for the user.

The 12V DC power supply 60 may further provide power to the fan 36 and is a path for the power to the heating element 66 via cord 94. For example, in the event of a heating element 66 failure, the power supply 60 will shut down due to the routing of power through the heating element 66. In the event of a 12V power supply failure, heating element 66 may de-energize and the operational indicator 14 may indicate that the thermostat 46 is still operational to aid in trouble shooting the apparatus 10. In the event of a fan 36 failure or replacing heating element 66 with a larger than recommended element thermal protection device 56 will open and shut down power supply 60 and heating element 66.

During normal operations, the thermostat 46 may close when there is a demand for heat due to the temperature of the outside air. Upon closing, the thermostat 46 will turn on the indicator 14 and power supply 60, which in turn may start the fan 36. The thermostat 46 may additionally turn on heating element 66, which may cause the inner cylinder 38 to begin to generate heat. Most of the heat may be drawn out of the inner cylinder 38 by the action of fan 36 and may be vented out of the rear cover 67. The heated air drawn from the inner cylinder 38 may be pulled past the thermostat 46 ensuring that the heated air temperature is monitored while the heating element 66 is energized. When the thermostat 46 reaches a preset temperature it may open and shut off power supply 60, operational indicator 14, and heating element 66. The inner cylinder 38 may thus begin to cool while the heating element 66 is off and heat may be transferred out of the apparatus 10 through both the outer cylinder covers 44, 67 and outer cylinder wall 72. When the temperature at thermostat 46 reaches a preset low temperature the apparatus 10 may began its cycle to begin the process of heating the surrounding area again.

Figure 5:
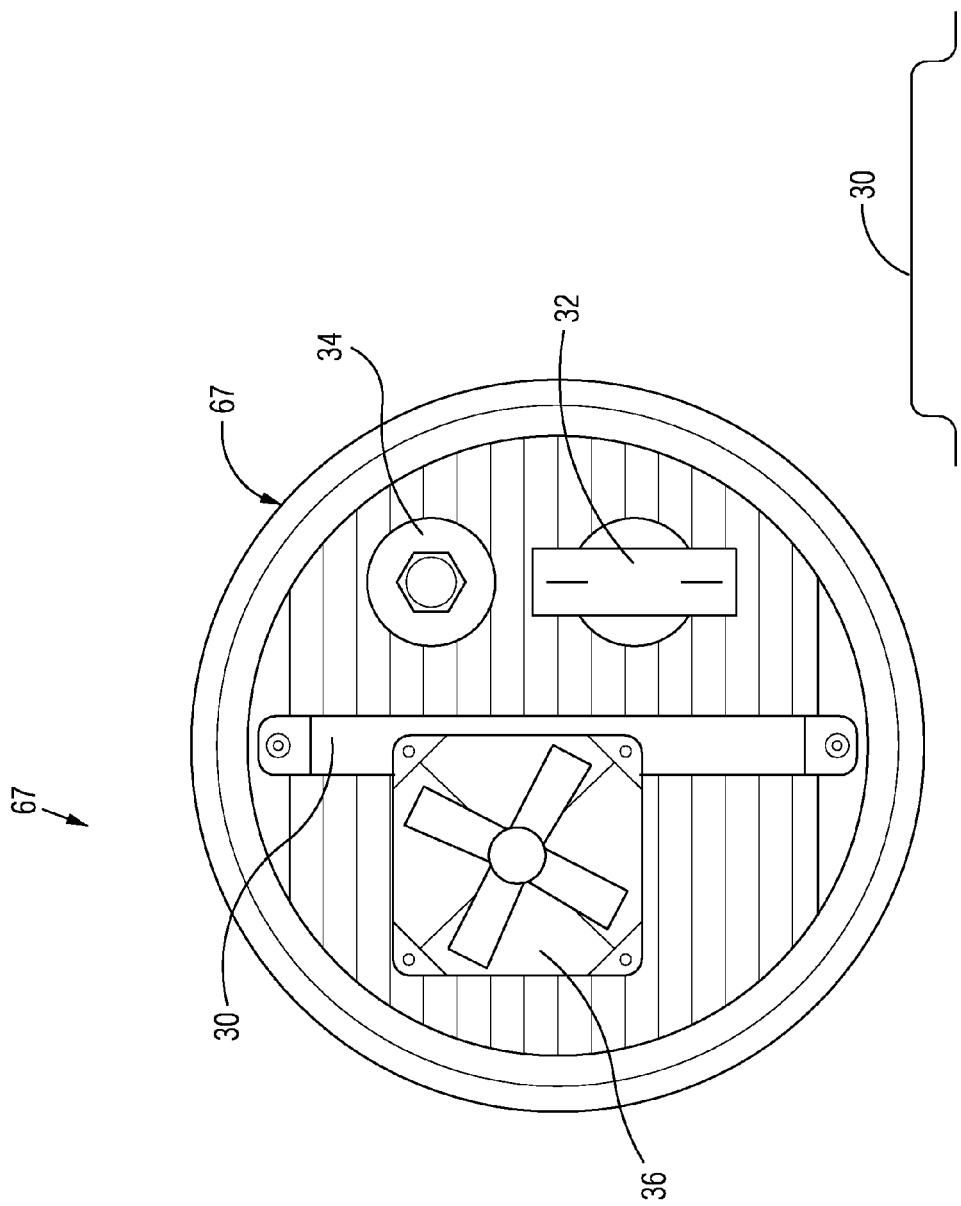
FIG. 5 is a front elevational view of the rear outer cover showing the locations of the fan, fan mounting bracket, circuit breaker, rivet locations and power cord access.

The assembly of the apparatus 10 may generally be assembled as best explained by the following: FIG. 5 shows the fan mounting bracket 30 along with fan 36 showing mounting holes for bracket and fan 36 of different sizes as might be required. The rear cover 67 may be secured in place with tamper proof screws or rivets through pre drilled holes to prevent any tampering with internal circuitry of the apparatus 10 by unqualified persons.

Figure 6:
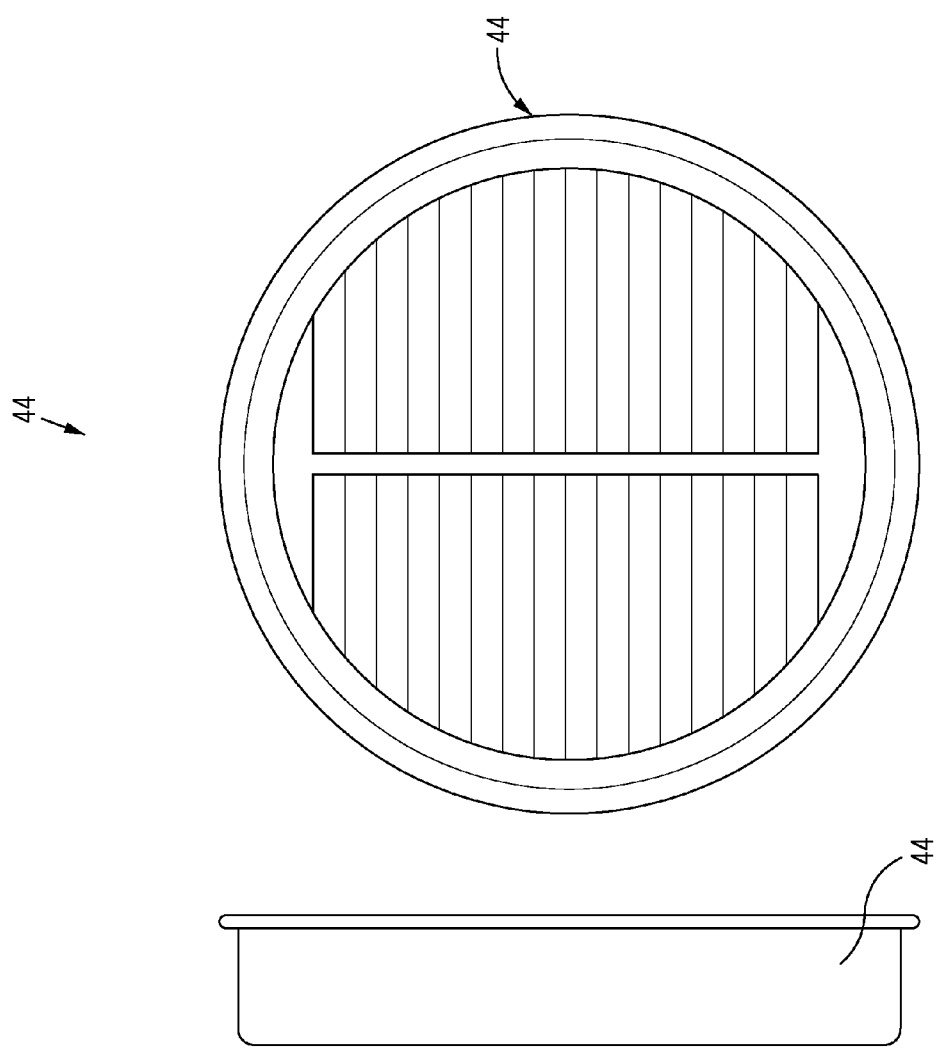
FIG. 6 is a front and side elevational view showing the front outer cover.
Figure 7:
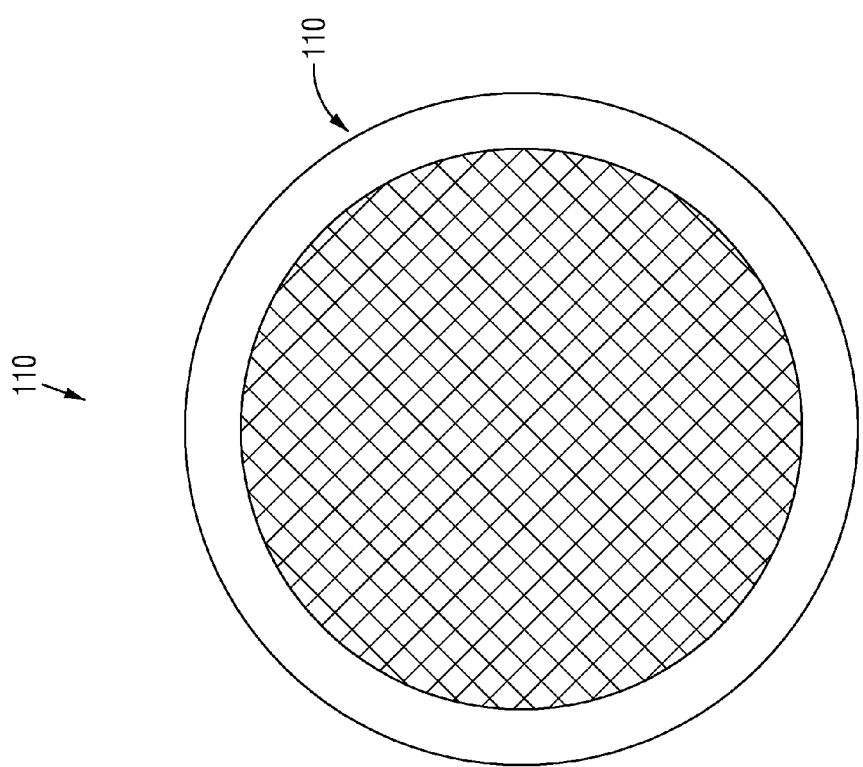
FIG. 7 is a front elevational view showing the front cover screen installed inside the front outside cover.

FIG. 6 shows the outer front cover 44 which may be removable for service and may be held in place by 2 clamps 116 as best shown in FIG. 1. The clamps 116 may further allow for easy removal of cover 44 in order to change or clean the screen 110. FIG. 7 shows the screen 110 for removing the inner cylinder 38 for service of heating element 66. These are the only user serviceable parts of the apparatus 10 that may require limited technical abilities. FIG. 8 shows the locations of some of the key parts in the rear end or the electrical end of the apparatus 10. No wiring is shown at this time in order to demonstrate a clear view of the parts needed for operation of the apparatus 10.

FIG. 8 shows the locations to each of the thermostat 46 relative to the operational indicator 14 and the 12V DC power supply 60. Bumper posts 18a, 18b may further limit the travel of the center cylinder 38 into the electronic area of the outer cylinder 72. Mounting clips 16a, 16b may be used to mount the power supply 60 and bumper post 18a may be part of the mounting system. Mounting bracket 168 may be used for ground block 64, which may be used to carry all the common and ground lines for the power supply 60 and heating element 66. Retainer clip 22 may function as a restraint for the power cord 94 leading to heating element 66 limiting the travel of the cord 94 when the center cylinder 38 is removed for maintenance.

Figure 11:
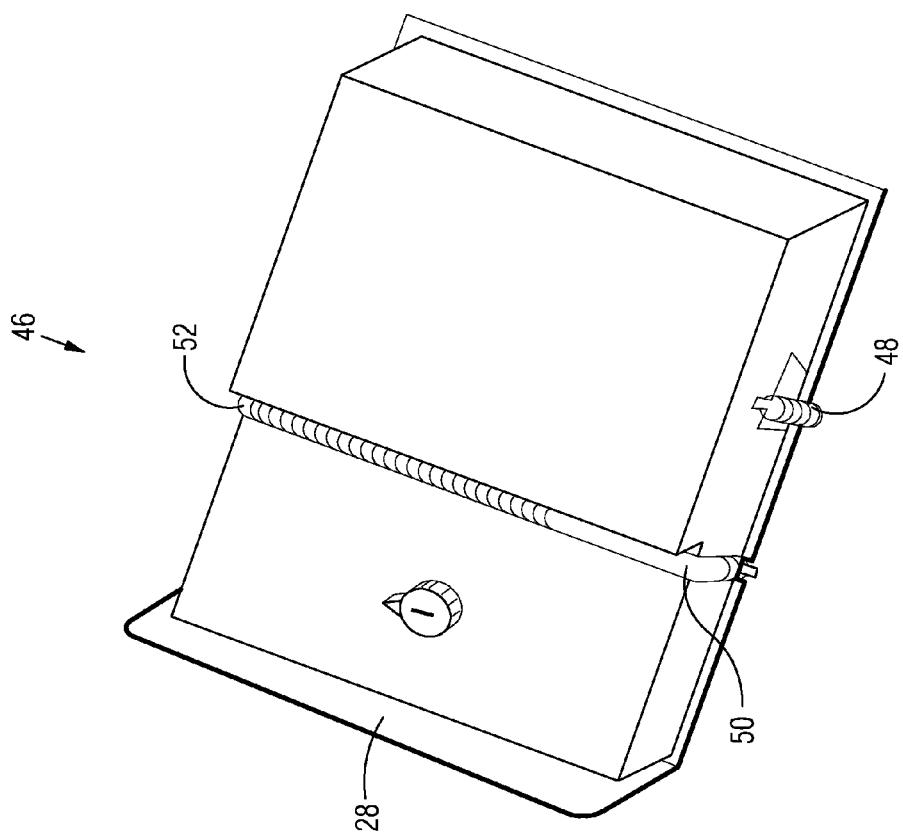
FIG. 11 is a perspective view showing the thermostat mounted on the mounting plate.
Figure 12:
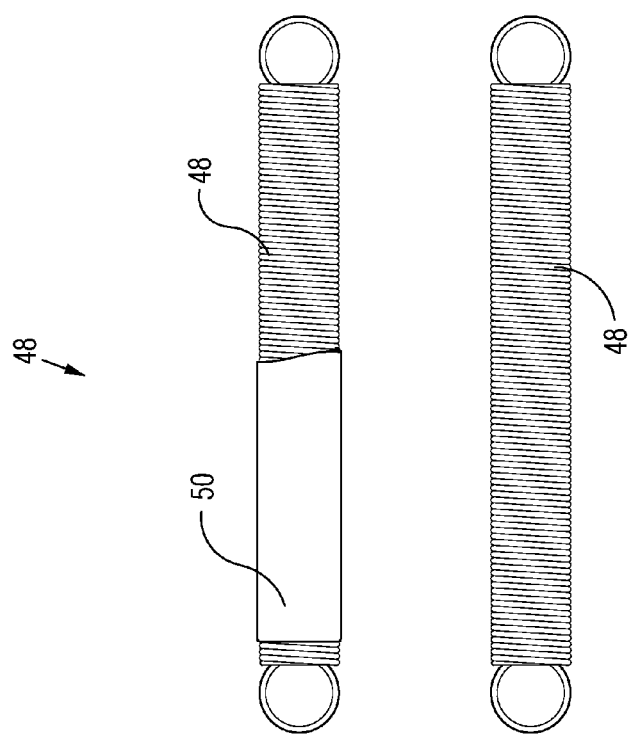
FIG. 12 is a side elevational view of the thermostat mounting springs showing the insulating shrink tube installed.

Referring to FIGS. 8-11, the thermostat 46 may be mounted on mounting plate 28 with retaining springs 48 and 52. The mounting plate 28 may further be placed on mounting bracket 11 whereby retainer 12 secures plate 28 into bracket 11. FIG. 3 further shows the mounting system for the thermostat 46 in order for the apparatus 10 to have the thermostat 46 in the airflow from the center cylinder 38. FIG. 8 and FIG. 11 further show retainer spring 48, 52 having a heat shrink tubing 50 to protect the springs 48, 52 due to their proximity to the contact point of the thermostat 46.

Referring to FIG. 2 and FIG. 3 again, the locations of the retainer clips 40 for the center cylinder 68 that holds the inner cylinder 38 in place inside of outer cylinder 72 are shown. The retainer clips 40 are used to isolate the inner cylinder 38 from the outer cylinder to allow for even heat transfer between the inner and outer cylinders 38, 72, respectively.

Referring to FIG. 13, the hook 118 may be mounted on a side of the outer cylinder 72 in order to hang the warmer out of the reach of playful pets or have it off the ground. The hook 118 may further be installed at the thermostat 46 or electrical end of the outer cylinder 72 when there is no internal fan 36 while the apparatus 10 with an internal fan 36 may have the hook 118 installed at the service end of the apparatus. This may ensure that the thermostat 46 may always monitor heat within the apparatus 10 thereby ensuring normal operation of the power supply 60 and other safety devices with limited chances for hot spots to occur.

FIG. 14 is the schematic diagram of the electrical control circuit 90 for 115V AC operation. As demonstrated by the diagram the apparatus may have an over voltage protection device in the form of a resettable circuit breaker 32. Also demonstrated is the thermal protection device 56 that may limit the temperature in the event of a failure of the thermal control circuits. The thermostat 46 may be set upon installation and may be secured with no access for adjustment to avoid tampering. The indicator 14 may allow for real time analysis of the thermostat's 46 functioning. An Optional indicator 62 may demonstrate power availability to the apparatus' power supply 60. The terminal block 64 may tie all common lines together and allows for the apparatus 10 to expand power supply functionality. The heart beat simulator 140 may be tied to power supply 60 and to terminal block 64 with driver circuit 138 if this option is chosen.

FIG. 15 is the schematic diagram for the 12V DC operation 91 for the apparatus 10. While the apparatus 10 is used in 12V DC operation, the internal power supply 60 will be bypassed or eliminated and the heating element 66 may be modified to operate on a 12V DC and indicator 14 may be replaced with a 12 volt lamp. All other internal electronic elements may remain the same.

FIG. 16 shows the heart beat simulator 140 and oscillator circuit 138. This optional unit may be utilized to simulate the heart beat of a feeding animal while pups, kittens or other still nursing pets are being fed and must be kept warm. This option can be installed along with the 12V power supply or used in the apparatus 10 while operating apparatus 10 in the 12V DC mode.

The method may further include the steps of: providing and locating a thermostat 46 within the outer cylinder; disposing the thermostat 46 exterior of the inner cylinder 38; providing and locating a heating element 66 within the inner cylinder 38; providing and coupling the heating element 66 to an external 115 volt alternating current power supply source 60; providing and locating a fan 36 in the outer cylinder for circulating heated air outwardly therefrom; providing and attaching a mounting plate 28 to the outer cylinder by locating the mounting plate 28 within the outer cylinder; providing and coupling a plurality of retainer springs 48, 52 to the mounting plate 28; providing and maintaining the thermostat 46 at a substantially stable position downstream of the heating element 66 by orienting the retainer springs 48, 52 perpendicular to each other; providing and communicatively coupling a circuit breaker 32 to the thermostat 46; providing a 12 volt direct current to the thermostat 46 by providing and electrically coupling an internal power supply source 60 to the circuit breaker 32; and providing for the circuit breaker 32 to automatically interrupt power to the heating element 66 when the thermostat 46 detects a temperature within the outer cylinder that exceeds a predetermined threshold temperature.

Figure 17:
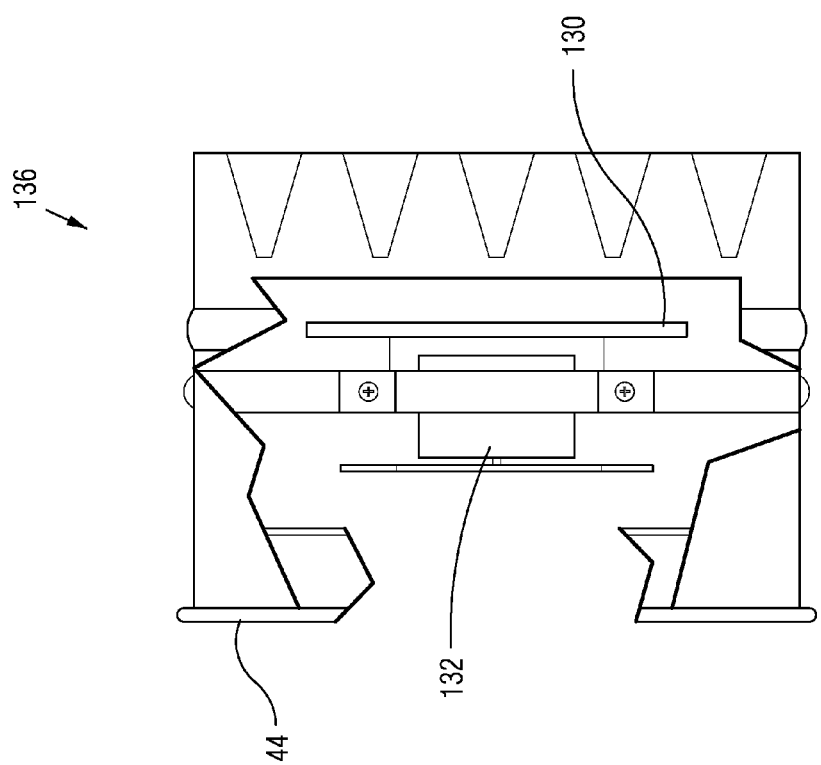
FIG. 17 is a cut away view of the solar powered fan attachment module showing the mounting hardware and locations.

As best shown in FIG. 17, in order to accommodate a warmer that does not have an internal circulation fan, a solar fan module 136 can be installed with no electrical wiring required by the user. The outer cover 44 may be removed and solar fan module 136 is installed in the end of outer cylinder 72. Cover 44 may be installed onto module 136 and the apparatus 10 may be used normally. Power for the fan 132 will be supplied by solar collector 130 while the heating element 66 is in operation. The optional solar fan module 136 may be used in both the A.C. and D.C. mode of operation.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable pet warmer for providing a safe and reliable heat source, said portable pet warmer comprising:
    an outer cylinder having front and rear open ends;
    front and rear covers removably attached to said front and rear open ends respectively;
    an inner cylinder removably positioned within said outer cylinder;
    a plurality of retainer clips mated to an outer surface of said inner cylinder and being removably engaged with an inner surface of said outer cylinder such that said inner cylinder remains spaced from said outer cylinder while said inner cylinder is positioned within said outer cylinder;
    a thermostat located within said outer cylinder;
    a heating element located within said inner cylinder and adapted to be coupled to an external 115 volt alternating current power supply source;
    a fan located in said outer cylinder for circulating heated air outwardly therefrom;
    a mounting plate attached to said outer cylinder;
    a plurality of retainer springs coupled to said mounting plate and oriented perpendicular to each other for maintaining said thermostat at a substantially stable position downstream of said heating element;
    a circuit breaker communicatively coupled to said thermostat; and
    an internal power supply source providing a 12 volt direct current to said thermostat, said internal power supply source being electrically coupled to said circuit breaker;
    wherein said circuit breaker automatically interrupts power to said heating element when said thermostat detects a temperature within said outer cylinder that exceeds a predetermined threshold temperature.

2. The portable pet warmer of claim 1, further comprising: a heart beat simulator situated within said outer cylinder and electrically coupled to said internal power supply source.

3. The portable pet warmer of claim 1, wherein said outer cylinder comprises:
    a thermal protection layer wrapped about an outer surface thereof;
    a hook attached to said outer surface for positioning said portable pet warmer above a ground level; and
    a plurality of bumper posts removably abutted with said inner cylinder in such a manner that said inner cylinder remains upstream of said mounting plate, said thermostat and said fan respectively.

4. The portable pet warmer of claim 1, wherein said front and rear covers are adjustable vents for selectively directing air flow into and away from said outer cylinder.

5. The portable pet warmer of claim 1, wherein said mounting plate comprises:
    a medial section; and
    first and second lateral sections monolithically formed with opposed ends of said medial section;
    wherein said first lateral section is angularly offset at an oblique angle away from said medial section;
    wherein said second lateral section is angularly offset at a perpendicular angle away from said medial section;
    wherein said thermostat and said circuit breaker are seated directly on said medial section.

6. A portable pet warmer for providing a safe and reliable heat source, said portable pet warmer comprising:
    an outer cylinder having axially opposed front and rear open ends;
    front and rear covers removably attached to said front and rear open ends respectively;
    an inner cylinder removably positioned within said outer cylinder;
    a plurality of retainer clips mated to an outer surface of said inner cylinder and being removably engaged with an inner surface of said outer cylinder such that said inner cylinder remains spaced from said outer cylinder while said inner cylinder is positioned within said outer cylinder;
    a thermostat located within said outer cylinder and disposed exterior of said inner cylinder, said thermostat having a first pair of retaining tabs formed on outer walls thereof respectively;
    a heating element located within said inner cylinder and adapted to be coupled to an external 115 volt alternating current power supply source;
    a fan located in said outer cylinder for circulating heated air outwardly therefrom;
    a mounting plate attached to said outer cylinder and located therein, said mounting plate having a second pair of retaining tabs extending downwardly therefrom;
    a plurality of retainer springs coupled to said mounting plate and oriented perpendicular to each other for maintaining said thermostat at a substantially stable position downstream of said heating element, a first one of said retainer springs having end portions mated to said first pair of retaining tabs, a second one of said retainer springs having end portions mated to said second pair of retaining tabs;
    a circuit breaker communicatively coupled to said thermostat; and
    an internal power supply source providing a 12 volt direct current to said thermostat, said internal power supply source being electrically coupled to said circuit breaker;
    wherein said circuit breaker automatically interrupts power to said heating element when said thermostat detects a temperature within said outer cylinder that exceeds a predetermined threshold temperature.

7. The portable pet warmer of claim 6, further comprising: a heart beat simulator situated within said outer cylinder and electrically coupled to said internal power supply source.

8. The portable pet warmer of claim 6, wherein said outer cylinder comprises:
- a thermal protection layer wrapped about an outer surface thereof;
- a hook attached to said outer surface for positioning said portable pet warmer above a ground level; and
- a plurality of bumper posts removably abutted with said inner cylinder in such a manner that said inner cylinder remains upstream of said mounting plate, said thermostat and said fan respectively.

9. The portable pet warmer of claim 6, wherein said front and rear covers are adjustable vents for selectively directing air flow into and away from said outer cylinder.

10. The portable pet warmer of claim 6, wherein said mounting plate comprises:
- a medial section; and
- first and second lateral sections monolithically formed with opposed ends of said medial section;
- wherein said first lateral section is angularly offset at an oblique angle away from said medial section;
- wherein said second lateral section is angularly offset at a perpendicular angle away from said medial section;
- wherein said thermostat and said circuit breaker are seated directly on said medial section.

11. A method of utilizing a portable pet warmer for providing a safe and reliable heat source, said method comprising the steps of:
- providing an outer cylinder having axially opposed front and rear open ends;
- providing and removably attaching front and rear covers to said front and rear open ends respectively;
- providing and removably positioning an inner cylinder within said outer cylinder;
- providing and mating a plurality of retainer clips to an outer surface of said inner cylinder;
- maintaining said inner cylinder spaced from said outer cylinder while said inner cylinder is positioned within said outer cylinder by removably engaging said retainer clips with an inner surface of said outer cylinder;
- providing and locating a thermostat within said outer cylinder;
- disposing said thermostat exterior of said inner cylinder;
- providing and locating a heating element within said inner cylinder;
- coupling said heating element to an external 115 volt alternating current power supply source;
- providing and locating a fan in said outer cylinder for circulating heated air outwardly therefrom;
- providing and attaching a mounting plate to said outer cylinder by locating said mounting plate within said outer cylinder;
- providing and coupling a plurality of retainer springs to said mounting plate;
- maintaining said thermostat at a substantially stable position downstream of said heating element by orienting said retainer springs perpendicular to each other;
- providing and communicatively coupling a circuit breaker to said thermostat;
- providing a 12 volt direct current to said thermostat by providing and electrically coupling an internal power supply source to said circuit breaker; and
- said circuit breaker automatically interrupting power to said heating element when said thermostat detects a temperature within said outer cylinder that exceeds a predetermined threshold temperature.

* * * * *